United States Patent [19]

Getts

[11] 3,957,721

[45] May 18, 1976

[54] STABILIZER COMBINATIONS OF (β-AMINOACRLYL) COMPOUNDS AND PHENOLIC COMPOUNDS AND STABILIZED COMPOSITIONS THEREOF

[75] Inventor: Ronald G. Getts, Cleveland, Ohio

[73] Assignee: The B. F. Goodrich Company, Akron, Ohio

[22] Filed: Aug. 2, 1974

[21] Appl. No.: 494,093

[52] U.S. Cl. .................... 260/45.8 N; 252/431 R; 252/431 N; 260/45.9 R
[51] Int. Cl.² ........................................ C08R 5/00
[58] Field of Search ............. 260/45.8 N, 45.8 NZ, 260/45.8 R, 45.8 NT, 45.9 R

[56] References Cited
UNITED STATES PATENTS

| | | | |
|---|---|---|---|
| 3,567,724 | 3/1971 | Beears | 260/45.8 NT |
| 3,706,740 | 12/1972 | Dexter | 260/45.8 NT |
| 3,784,565 | 1/1974 | Parker | 260/45.9 R |

*Primary Examiner*—Donald E. Czaja
*Assistant Examiner*—William E. Parker
*Attorney, Agent, or Firm*—Alan A. Csontos

[57] ABSTRACT

Combinations of (β-aminoacrylyl) compounds and phenolic compounds provide excellent stabilization for polyolefinic polymers. Combinations of bis(β-aminoacrylyl) compounds and alkylhydroxyphenyl-substituted isocyanurates are particularly preferred as stabilizers, for the combinations exhibit synergism between the compounds.

12 Claims, No Drawings

STABILIZER COMBINATIONS OF (β-AMINOACRLYL) COMPOUNDS AND PHENOLIC COMPOUNDS AND STABILIZED COMPOSITIONS THEREOF

BACKGROUND OF THE INVENTION

Phenolic stabilizers and, in particular, alkylhydroxyphenyl-substituted esters, triazines and isocyanurates, are known to the art. The compounds are used to stabilize a wide range of materials and have particular utility as stabilizers for polyolefin polymers. (β-aminoacrylyl) compounds are also known to the art (see U.S. Pat. No. 3,784,565, German Pat. No. 1,544,768, J. Amer. Chem. Soc., Vol. 67, Page 1017 (June, 1945), and Enka Biniiru, Vol. 10, No. 26 (1970) ). However, these materials are known for their ability to stabilize chlorine-containing polymers such as polyvinyl chloride, and are very poor stabilizers for polyolefinic polymers. Unexpectedly, it has been discovered that combinations of (1) phenolic compounds, particularly alkylhydroxyphenyl-substituted esters, triazines, or isocyanurates, and (2) (β-aminoacrylyl) compounds, particularly bis(β-aminoacrylyl) derivatives of cyclic and linear hydrocarbons, provide excellent stability for polyolefinic polymers.

SUMMARY OF THE INVENTION

Combinations of (1) a phenolic compound and (2) a (β-aminoacrylyl) compound of the structure

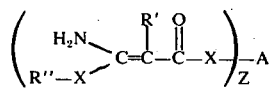

wherein X is S or O; R' is hydrogen or a methyl or ethyl radical; R'' is an alkyl group containing 1 to about 24 carbon atoms, an aryl group containing 6 to about 18 carbon atoms, or an ester group containing 3 to about 24 carbon atoms total in the group; A is an alkyl group containing 1 to about 24 carbon atoms, an alkylene radical containing 1 to about 18 carbon atoms in the radical, or the group

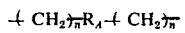

where $R_A$ is benzene, naphthalene, or a cycloalkyl radical containing 5 to 8 carbon atoms in the ring and $n = 0$ to 6; and $Z = 1$ when A is an alkyl group and $Z = 2$ when A is an alkylene group or the defined group, are provided. The combinations are useful to stabilize polyolefinic polymers.

DETAILED DESCRIPTION OF THE INVENTION (β-aminoacrylyl) compounds are known to the art to be heat stabilizers for chlorine-containing polymers (see U.S. Pat. No. 3,784,565). However, they exhibit very little stabilization when used in polyolefinic polymers, particularly in poly-α-olefin homopolymers such as polypropylene. Phenolic compounds are known to be useful for stabilizing polyolefinic polymers. The most efficient and effective phenolic compounds for these polymers are the alkylhydroxyphenyl-substituted compounds wherein the nucleus is an ester or a heterocyclic structure such as a triazine or an isocyanurate. Because of the poor stabilization ability of the (β-aminoacrylyl) compound, it was completely unexpected that a combination of these two types of compounds would provide excellent stability for polyolefinic polymers. The stability obtained is much better than the additive effects of either compound used alone and, in some cases, synergism is exhibited between the compounds.

The (β-aminoacrylyl) compounds are used in a range of from about 0.01 part to about 5 parts by weight, and more preferredly from about 0.05 part to about 3 parts by weight based on 100 parts by weight of polyolefinic polymer. The phenolic compound is used at similar levels; i.e. at from about 0.01 part to about 5 parts, and more preferredly from about 0.05 part to about 3 parts by weight per 100 parts by weight of the polyolefinic polymer. The total weight of stabilizer employed then is from about 0.02 part to about 10 parts by weight per 100 parts by weight of polymer. Within the weight range, the weight ratio of (β-aminoacrylyl) compound to phenolic compound is from about 5:1 to 1:5. The combination of the two types of compounds exhibits particularly good stabilization efficiency at a weight ratio of (β-aminoacrylyl) compound to phenolic compound of about 1:1.

The (β-aminoacrylyl) compounds are of the structure

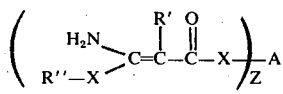

wherein X is sulfur or oxygen; R' is hydrogen or a methyl or ethyl radical; R'' is selected from the group consisting of alkyl groups containing 1 to about 24 carbon atoms, aryl groups containing 6 to about 18 carbon atoms, and ester groups containing 3 to about 24 carbon atoms total in the group; A is selected from the group consisting of alkyl groups containing 1 to about 24 carbon atoms in the group, alkylene groups containing 1 to about 18 carbon atoms in the group, and the defined group

where $n$ is 0 to 6 and $R_A$ is a benzene radical, a naphthalene radical, or a cycloalkyl radical containing 5 to 8 carbon atoms in the ring; and $Z = 1$ when A is an alkyl group and $Z = 2$ when A is an alkylene group or the defined group.

Examples of the (β-aminoacrylyl) compounds are when A is an alkyl group, Z is equal to 1: (β-methoxy-β-aminoacrylylthio)ethane; (β-methoxy-β-aminoacrylyloxy)ethane; (β-ethylcarbonyloxyethylenethio-β-aminoacrylyloxy)ethane; (β-octadecylthio-β-aminoacrylyloxy)ethane; (β-ethoxy-β-aminoacrylylthio)propane; (β-ethoxy-β-aminoacrylyloxy) hexane; (β-ethylthio-βaminoacrylylthio)octane; (β-ethylthio-β-aminoacrylyloxy)octane; (β-propyloxy-β-aminomethacrylyloxy)decane; (β-propyloxy-β-aminoacrylyloxy)decane; (β-hexylcarbonyloxyethyleneoxy-β-aminoacrylylthio)dodecane; (β-octylthio-β-aminoacrylylthio)dodecane; (β-octyloxy-β-aminoacrylyloxy)dodecane; (β-phenyloxy-β-aminomethacrylylthio)dodecane; (β-benzyloxy-β-aminoacrylyloxy)dodecane; (β-nonylphenyloxy-β-aminoacrylylthio)octadecane; (β-octadecylthio-β-aminoacrylyloxy)octadecane; (β-heptadecylcarbonyloxyethylenethio-β-aminoacrylyloxy)ethane;

($\beta$-octadecyloxycarbonylethylenethio-$\beta$-aminoacrylyl)dodecane, and the like.

When A is an alkylene group, Z is equal to 2, and examples of the bis($\beta$-aminoacrylyl) compounds are: 1,3-bis($\beta$-ethoxy-$\beta$-aminoacrylyloxy)propane; 1,6-bis-($\beta$-octylthio-$\beta$-aminoacrylyloxy)hexane; 1,6-bis-($\beta$-octylthio-$\beta$-aminoacrylylthio)hexane; 1,8-bis-($\beta$-benzyloxy-$\beta$-aminoacrylyloxy) octane; 1,10-bis-($\beta$-ethoxy-$\beta$-aminoacrylyloxy)decane; 1,10-bis-($\beta$-dodecylthio-$\beta$-aminoacrylyloxy)decane; 1,12-bis-($\beta$-dodecylthio-$\beta$-aminoacrylylthio)dodecane; 1,12-bis-($\beta$-octylcarbonyloxyethyleneoxy-$\beta$-aminoacrylyloxy)dodecane; 1,18-bis-($\beta$-octadecylthio-$\beta$-aminoacrylyloxy)octadecane, and the like.

When A is the structure

Z is equal to 2, and examples of the compounds are: 1,4-bis-($\beta$-methoxy-$\beta$-aminoacrylyloxy)benzene; $\alpha,\alpha'$-bis-($\beta$-ethoxy-$\beta$-aminoacrylyloxy)-1,4-dimethylbenzene; $\alpha,\alpha'$-bis-($\beta$-ethylthio-$\beta$-aminoacrylyloxy)-1,4-dimethylbenzene; $\alpha,\alpha'$-bis-($\beta$-ethoxy-$\beta$-aminoacrylylamino)-1,4-dimethylbenzene; $\alpha,\alpha'$-bis-($\beta$-ethoxy-$\beta$-aminoacrylyloxy)-1,4-dimethylcyclohexane; $\alpha,\alpha'$-bis-($\beta$-ethoxy-$\beta$-aminoacrylylthio)-1,4-dimethylbenzene; $\alpha,\alpha'$-bis-($\beta$-octylthio-$\beta$-aminoacrylyloxy)-1,3-dimethylcyclopentane; $\alpha,\alpha'$-bis-($\beta$-benzyloxy-$\beta$-aminoacrylyloxy)-1,4-dimethylbenzene; $\alpha,\alpha'$-bis-($\beta$-octadecylthio-$\beta$-aminoacrylyloxy)-1,4-dimethylbenzene; $\alpha,\alpha'$-bis-($\beta$-4-butylbenzyloxy-$\beta$-aminoacrylyloxy)-1,4-dimethylbenzene; 1,4-bis-($\beta$-dodecylthio-$\beta$-aminomethacrylyloxy) benzene; $\beta,\beta'$-bis-($\beta$-butoxy-$\beta$-aminoacrylyloxy)-1,4-diethylbenzene; $\gamma,\gamma'$-bis-($\beta$-octylthio-$\beta$-aminoacrylyloxy)-1,4-dipropylbenzene; 2,6-bis-($\beta$-ethoxy-$\beta$-aminoacrylyloxy)naphthalene; and the like. More preferred, $n = 0$ or 1 and $R_A$ is a benzene or a cyclohexane radical. Examples of such compounds are $\alpha,\alpha'$-bis-($\beta$-ethoxy-$\beta$-aminoacrylyloxy)-1,4-dimethylbenzene; $\alpha,\alpha'$-bis-($\beta$-ethoxy-$\beta$-aminoacrylylthio)-1,4-dimethylbenzene; $\alpha,\alpha'$-bis-($\beta$-ethoxy-$\beta$-aminoacrylyloxy)-1,4-dicyclohexane; $\alpha,\alpha'$-bis-($\beta$-octadecylthio-$\beta$-aminoacrylyloxy)-1,4-dimethylbenzene; and the like.

The more preferred ($\beta$-aminoacrylyl) compounds are the bis-compounds; i.e. where A is an alkylene or the defined group and Z = 2. The compounds, used with many phenolic compounds, exhibit synergism in the stabilization of polyolefinic polymers.

The ($\beta$-aminoacrylyl) compounds are prepared in a three-step process wherein first, an appropriate alcohol, mercaptan or chloride is reacted with a cyanoacetylating agent to form an intermediate which is, second, reacted with an alcohol or thioalcohol of the formula R-XH, where R is defined as above, said reaction performed in the presence of hydrogen halide, to form a salt complex which is, third, added to a solution of sodium bicarbonate in water and dichloroethane. The rather complex process is clearly and fully described in U.S. Pat. No. 3,784,565 which is hereby incorporated by reference.

The phenolic compounds employed are phenolic stabilizers known to the art. Examples of such compounds are 2,6-di-t-butyl phenol; 2-methyl-4,6-dinonyl phenol; 2,6-di-t-butyl-p-cresol; 2,2'-methylenebis(4-methyl-6-t-butyl phenol); 1,1'-methylenebis(2-naphthol); 4,4'-methylenebis (2,6-di-t-butyl phenol); 4,4'-thiobis(6-t-butyl-m-cresol); and the like. Although any phenolic stabilizer used in combination with the ($\beta$-aminoacrylyl) compounds should exhibit the unexpected results obtained, the more preferred phenolic stabilizers are those having alkylhydroxyphenyl substituents on an ester base or a heterocyclic nucleus.

Examples of phenolic stabilizers having alkylhydroxyphenyl substituents on an ester base are compounds of the formula

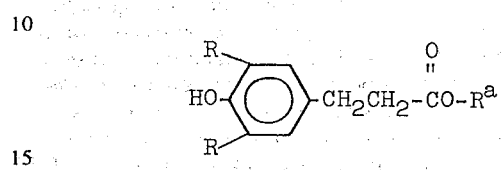

wherein R is hydrogen or an alkyl group of 1 to 9 carbon atoms, where at least one R must be an alkyl group, and $R^a$ is an alkyl group of 1 to 18 carbon atoms, exemplified by octadecyl-3-(3',5'-di-t-butyl-4'-hydroxyphenyl)propionate (see U.S. Pat. No. 3,330,859 for other examples); compounds of the formula

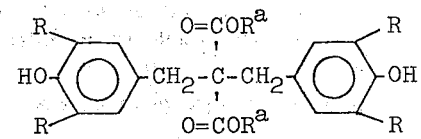

wherein R and $R^a$ are defined as above, exemplified by dilauryl-$\alpha,\alpha'$-bis(3,5-di-t-butyl-4-hydroxybenzyl) malonate (see U.S. Pat. No. 3,627,725 for other examples); compounds of the formula

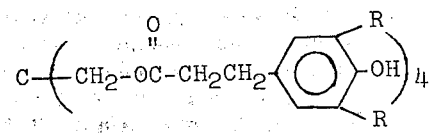

wherein R is defined as above, exemplified by tetrakis(-methylene-3-(3', 5'-di-t-butyl-4'-hydroxyphenyl)propionate)methane; and the like.

Examples of compounds having alkylhydroxyphenyl substituents on a heterocyclic nucleus are compounds where the heterocyclic nucleus is a triazine nucleus such as compounds of the formula

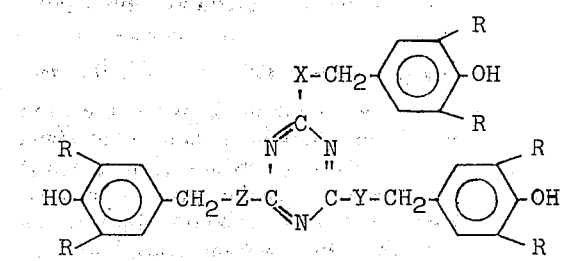

wherein X, Y and Z are sulfur, oxygen, or nitrogen, and R is defined as above, exemplified by 2,4,6-tris(4-hydroxy-3,5-di-t-butyl benzylthio)-1,3,5-triazine (see British Pat. No. 977,589 for other examples); compounds of the formula

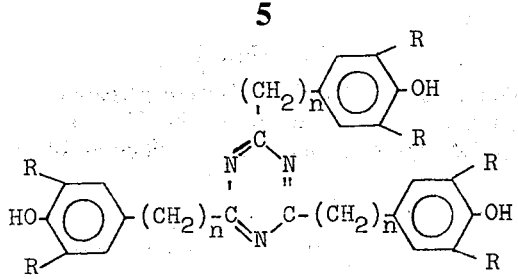

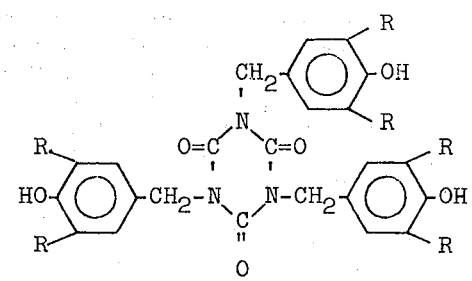

where R is defined as above, and n is 0 to 6, exemplified by 2,4,6-tris(3',5'-di-t-butyl-4'-hydroxybenzyl)-1,3,5- wherein R is defined as above, exemplified by tris-(3,5-di-t-butyl-4-hydroxybenzyl)isocyanurate (see U.S. Pat. No. 3,531,483 for other examples); compounds of the formula

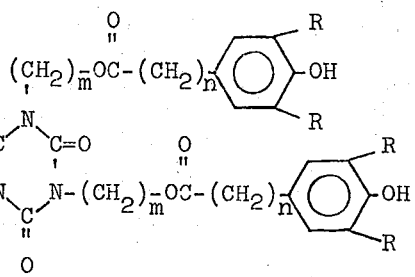

triazine (see U.S. Pat. No. 3,706,740 for other examples); compounds of the formula wherein R and n are defined as above, and m is 1 to 3, exemplified by 2,2',2''-tris(3-(3,5-di-t-butyl-4-hydrox-

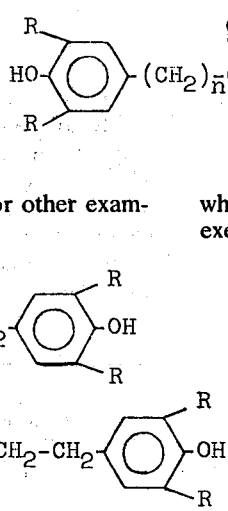

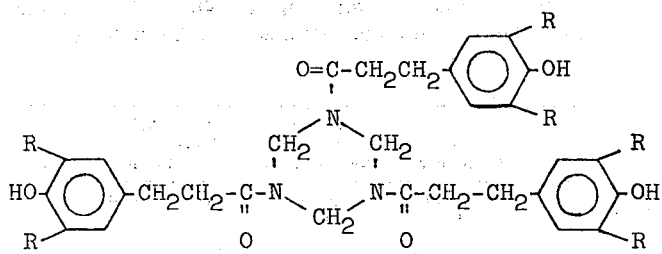

wherein R is defined as above, exemplified by hexahydro-1,3,5-tris-β-(3,5-di-t-butyl-4-hydroxyphenyl)propionyl-s-triazine (see U.S. Pat. No. 3,567,724 for other examples); compounds of the formula yphenyl)propionyloxy)ethyl isocyanurate (see U.S. Pat. No. 3,678,047 for further examples); and the like.

The combination of the (β-aminoacrylyl) compound and the phenolic compound has particular utility for

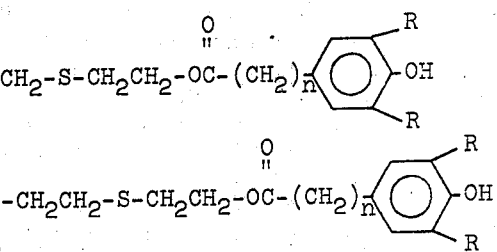

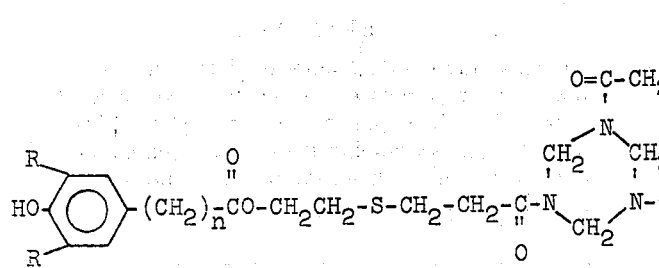

wherein R and n are defined as above, exemplified by 1,3,5-tris(4'-hydroxy-3',5'-di-t-butylphenylpropionyloxyethylthiopropionyl)hexahydro-1,3,5-triazine (see U.S. Pat. No. 3,694,440 for further examples); and the like.

Examples of compounds having alkylhydroxyphenyl substituents on an isocyanurate nucleus are compounds of the formula stabilizing polyolefinic polymers against degradation. By polyolefinic polymers is meant homopolymers of interpolymerized units of α-monoolefinic monomers containing 2 to about 10 carbon atoms such as polyethylene, polypropylene, polyisobutylene, poly-1-butene, poly-1-hexene, poly-1-decene, and the like; copolymers of interpolymerized units of α-monoolefinic monomers such as ethylene-propylene polymers, ethylenebutene polymers, and the like, and copolymers of a major portion of interpolymerized units of α-monoolefin monomer with a minor portion of interpolymerized units of a copolymerizable monomer such as poly(isoprene-isobutylene), poly(ethylene-vinyl acetate), poly(ethylene-ethyl acrylate), poly(ethylene-butadiene), and the like; and α-monoolefin-polyene terpolymers such as ethylene-propylene-diene polymers, where the diene is butadiene, 1,4-hexadiene, dicyclopentadiene, ethylidene norbornene, or the like.

The combination stabilizer system is particularly effective in stabilizing poly-α-monoolefin polymers against degradation due to heat and oxygen. Of the monoolefin polymers, the stabilizer combination provides excellent protection for polypropylene.

The (β-aminoacrylyl) compound and the phenolic compound can be admixed with the polyolefinic polymers using two-roll mills, internal mixers such as Banbury mixers and extruders, and the like, following standard mixing procedures and techniques. Another method of mixing is to dissolve the (β-aminoacrylyl) compound and the phenolic compound in a solvent such as acetone or benzene, add the solution to a slurry or solution of the polymer in a solvent, and evaporate off the solvent(s).

Compositions containing the novel combination of compounds can also contain many other known compounding ingredients such as fillers like carbon black, silica, metal carbonates, talc, asbestos, and the like; pigments and colorants; fungicides, and many more standard ingredients known to the art.

The stabilizer combinations were evaluated by mixing them with polypropylene and the resulting compositions tested for their heat and oxygen stability using an air-oven aging test at 140°C. and an oxygen absorption test at 150°C. Test samples were prepared by dissolving the stabilizer compounds in benzene, swelling the polypropylene polymer in benzene, admixing the two mixes, and evaporating off the benzene. At times, the stabilized composition was extruded at 220°C. at 50 rpm prior to molding samples (6 inches × 6 inches × 30 mils) at 220°C., which samples are then cut into strips 1 inch by 2 inches by 30 mils thick. These strips are employed in the oven aging and oxygen absorption tests.

The heat stability (oven aging) testing consisted of aging the samples in an air-circulation oven at 140°C. until visual cracking of the sample was observed. At the first signs of crack development, the strip is bent slightly to see if it breaks (embrittlement). The time to the onset of cracking or embrittlement is measured. Samples are run in duplicate and the data averaged.

The oxidative stability (oxygen absorption) test consisted of aging the samples at 150°C. in an atmosphere of pure oxygen and recording the oxygen uptake of the samples. The test used is a standard oxygen absorption test where the samples are hung in pure oxygen and the volume of oxygen in the chamber measured. At a decrease of 0.1 cc of oxygen in the chamber (taken up by the sample), 0.1 cc of oxygen is added to the chamber and its addition recorded. The measurement is then oxygen demand (uptake) in the chamber versus time. This data is plotted and time to failure is determined by the onset of rapid oxygen uptake by the sample. Test samples are run in duplicate and the data averaged.

The following examples serve to more fully illustrate the combinations and compositions of this invention. The recipes are given in parts by weight unless otherwise specified.

EXAMPLE I (β-aminoacrylyl) compounds were prepared following the procedures disclosed in U.S. Pat. No. 3,784,565. The compounds are identified as follows:

| Compound | Identification |
| --- | --- |
| A | (β-octadecylthio-β-aminoacrylyloxy)ethane |
| B | (β-heptadecylcarbonyloxyethylene-thio-β-aminoacrylyloxy)ethane |
| C | (β-octadecyloxycarbonylethylene-thio-β-aminoacrylyloxy)ethane |
| D | 1,10-bis-(β-ethoxy-β-aminoacrylyloxy)decan |
| E | α,α'-bis-(βethoxy-β-aminoacrylyloxy)-1,4-dimethylcyclohexane |
| F | α,α'-bis-(β-ethoxy-β-aminoacrylyl-thio)-1,4-dimethylbenzene |
| G | α,α'-bis-(β-ethoxy-β-aminoacrylyloxy-1,4-dimetylbenzene |
| H | α,α'-bis-(β-benzyloxy-β-aminoacrylyloxy)-1,4-dimethylbenzene |

The (β-aminoacrylyl) compounds have little if any ability to stabilize polyolefinic polymers against heat and oxygen degradation, as the following data shows. The compounds were used in parts by weight per 100 parts by weight of polypropylene (Profax 6501 manufactured by Hercules Chemical Co. was used). The test employed was air ovenaging at 140°C. The sample compositions were not extruded prior to molding.

| Compound | Parts Per 100 Parts Polypropylene | Oven-Aging, Hours at 140°C. To Failure |
| --- | --- | --- |
| Control | None | Less than 24 |
| D | 0.25 | 30 |
|   | 0.50 | 30 |
| E | 0.25 | 30 |
|   | 0.50 | 30 |
| F | 0.25 | 30 |
|   | 0.50 | 30 |
| G | 0.25 | 21 |
|   | 0.50 | 30 |
| H | 0.25 | 30 |
|   | 0.50 | 30 |

EXAMPLE II

Combinations of (β-aminoacrylyl) compounds and phenolic compounds were evaluated as stabilizers for a poly-α-olefin homopolymer (polypropylene). The phenolic compounds employed are an ester-based phenolic compound and a heterocyclic-based phenolic compound.

| Phenolic Compound | Identification |
| --- | --- |
| a | Dilauryl-α,α'-bis-(3,5-di-t-butyl-4-hydroxybenzyl)malonate |
| d | Tris-(3,5-di-t-butyl-4-hydroxybenzyl)isocyanurate |

The (β-aminoacrylyl) compounds and phenolic compounds were mixed into polypropylene at the designated parts by weight per 100 parts by weight of polypropylene. Testing consisted of air oven-aging at 140°C. until failure of the sample. Recipes used and data obtained are as follows. The samples were not extruded prior to molding.

| β-aminoacrylyl Compound | Parts | Phenolic Compound | Parts | Oven-Aging, Hours at 140°C. to Failure |
|---|---|---|---|---|
| — | — | — | — | less than 24 |
| — | — | a | 0.25 | 1008 |
| — | — | a | 0.50 | 2448 |
| — | — | d | 0.25 | 360 |
| — | — | d | 0.50 | 720 |
| D | 0.25 | — | — | 30 |
| D | 0.50 | — | — | 30 |
| D | 0.25 | a | 0.25 | 2280 |
| D | 0.25 | d | 0.25 | 1440 |
| E | 0.25 | — | — | 30 |
| E | 0.50 | — | — | 30 |
| E | 0.25 | a | 0.25 | 2160 |
| E | 0.25 | d | 0.25 | 1656 |
| F | 0.25 | — | — | 30 |
| F | 0.50 | — | — | 30 |
| F | 0.25 | a | 0.25 | 3120 |
| F | 0.25 | d | 0.25 | 3144 |
| G | 0.25 | — | — | 21 |
| G | 0.50 | — | — | 30 |
| G | 0.25 | a | 0.25 | 1872 |
| G | 0.25 | d | 0.25 | 2280 |
| H | 0.25 | — | — | 30 |
| H | 0.50 | — | — | 30 |
| H | 0.25 | a | 0.25 | 1608 |
| H | 0.25 | d | 0.25 | 840 |

The (β-aminoacrylyl) compounds themselves show little, if any, ability to stabilize polyolefinic polymers. In contrast, the phenolic compounds are known to be good stabilizers for polyolefinic polymers. It was totally unexpected that combinations of the two compounds would yield results much better than their additive effects and, in cases, synergistic results are obtained such as in sample combinations (D), (E), (F), (G), and (H) with (d), and (F) with (a).

EXAMPLE III

Bis-(β-aminoacrylyl) compounds were combined with an alkylhydroxyphenyl-substituted heterocyclic based stabilizer, and the combination used to stabilize polypropylene resin. The phenolic compound employed is (e) 2,2',2''-tris-(3-(3,5-di-t-butyl-4-hydroxyphenyl)propionyloxy)ethyl isocyanurate. The samples were tested for ovenaging stability at 140°C. The sample compositions were not extruded prior to molding. The recipes used and results obtained are as follows:

| Bis-(βaminoacrylyl) Compound | Parts | Phenolic Compound | Parts | Oven-Aging Hours at 140°C. To Failure |
|---|---|---|---|---|
| — | — | e | 0.25 | 1524 |
| D | 0.25 | e | 0.25 | 3504 |
| E | 0.25 | e | 0.25 | 3624 |
| F | 0.25 | e | 0.25 | 3504 |
| G | 0.25 | e | 0.25 | 3396 |
| H | 0.25 | e | 0.25 | 3000 |

The data shows that in all cases the combination of the invention provided excellent protection for the polypropylene polymer.

EXAMPLE IV

Further combinations of (β-aminoacrylyl) compounds and phenolic compounds were evaluated as stabilizers for poly-α-olefin polymers. The (β-aminoacrylyl) compounds employed are (A), (B), (C), and (G), which are identified in Examples II and III, and an alkylhydroxyphenyl-substituted ester-based phenol (b) tetrakis-(methylene-3-(3',5'-di-t-butyl-4'-hydroxyphenyl)propionate)methane and an alkylhydroxyphenyl-substituted heterocyclic-based phenol (c) 2,4,6-tris-(4-hydroxy-3,5-di-t-butyl-benzylthio)-1,3,5-triazine.

The samples were prepared as in the preceding examples; i.e. by admixing solutions of the (β-aminoacrylyl) compound and the phenolic compound with a solution or slurry of polypropylene. However, in this example, the test samples were extruded to provide additional mixing prior to molding the test strips. The samples were tested for stability to heat and oxygen using both oven-aging testing at 140°C. and oxygen absorption at 150°C. The recipes used and results obtained are as follows. The compounds are used on a parts by weight basis per 100 parts by weight of polypropylene.

| (β-aminoacrylyl) Compound | Parts | Phenolic Compound | Parts | Oven-Aging, Hours at 140°C. To Failure | Oxygen Absorption Hours at 150°C. |
|---|---|---|---|---|---|
| G | 0.25 | — | — | 8 | 0.6 |
| — | — | a | 0.1 | 276 | 6.2 |
| — | — | a | 0.25 | 470 | — |
| — | — | b | 0.1 | 2352 | 22.2 |
| — | — | b | 0.25 | 2804 | 103.3 |
| — | — | c | 0.1 | 120 | 17.2 |
| — | — | c | 0.25 | 2196 | 128.1 |
| — | — | d | 0.1 | 120 | 6.0 |
| — | — | d | 0.25 | 624 | 9.8 |
| — | — | d | 0.50 | 1200 | 12.6 |
| — | — | e | 0.1 | 2304 | 18.6 |
| — | — | e | 0.25 | 2616 | 66.5 |
| G | 0.25 | a | 0.1 | 1332 | 17.2 |
| G | 0.25 | b | 0.1 | 3000 | 60.7 |
| G | 0.25 | c | 0.1 | 924 | 39.9 |
| G | 0.25 | d | 0.1 | 948 | 18.3 |
| G | 0.25 | d | 0.25 | 2772 | 30.9 |
| G | 0.25 | e | 0.1 | 3000 | 87.6 |
| A | 0.25 | d | 0.1 | 1128 | 50.7 |
| A | 0.25 | d | 0.25 | 2568 | 91.2 |
| B | 0.25 | a | 0.1 | 1704 | 19.3 |
| B | 0.25 | b | 0.1 | 2736 | 98.0 |
| B | 0.25 | c | 0.1 | 456 | 76.2 |
| B | 0.25 | d | 0.1 | 1800 | 53.9 |
| B | 0.25 | d | 0.25 | 3216 | 106.8 |
| B | 0.25 | e | 0.1 | 2472 | 83.6 |
| C | 0.25 | d | 0.1 | 1476 | 34.3 |
| C | 0.25 | d | 0.25 | 2412 | 56.0 |

In every instance, the stability obtained using the combination stabilizer of the invention was very good. The results using the combination were much better than what would have been predicted from the individual contributions of the compounds.

EXAMPLE IV

The (β-aminoacrylyl) compounds can be used in a weight ratio of from about 5:1 to 1:5 in combination with the phenolic compound. Excellent results are obtained at a 1:1 weight ratio of the compounds. The following samples were prepared at the designated parts by weight in 100 parts by weight of polypropylene. The test samples were not extruded prior to molding. The data shows that synergistic results were obtained over the entire weight ratio of (β-aminoacrylyl) compound, (G), to phenolic compound, (d), of 4:1 to 1:4.

| (β-aminoacrylyl) Compound | Parts | Phenolic Compound | Parts | Oven-Aging Hours at 140°C. To Failure |
|---|---|---|---|---|
| G | 0.25 | — | — | 21 |
| G | 0.50 | — | — | 30 |
| — | — | d | 0.25 | 360 |
| — | — | d | 0.50 | 720 |
| G | 0.1 | d | 0.4 | 1104 |
| G | 0.25 | d | 0.25 | 2280 |
| G | 0.4 | d | 0.1 | 840 |

I claim:

1. A stabilized polymer composition comprising (A) a polyolefinic polymer and (B) a stabilizer combination consisting essentially of (1) a phenolic stabilizer of the formula

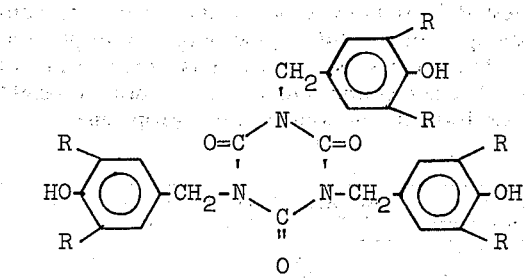

wherein R is H or an alkyl group of 1 to 9 carbon atoms where at least one R must be an alkyl group and (2) a (β-aminoacrylyl) compound of the structure

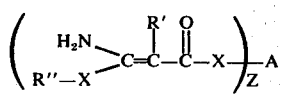

wherein X is sulfur or oxygen; R' is hydrogen or a methyl or ethyl radical; R'' is selected from the group consisting of alkyl groups containing 1 to about 24 carbon atoms, aryl groups containing 6 to about 18 carbon atoms, and ester groups containing 3 to about 24 carbon atoms total in the group; A is selected from the group consisting of alkyl groups containing 1 to about 24 carbon atoms in the group, alkylene groups containing 1 to about 18 carbon atoms in the group, and the defined group

where n is 0 to 6 and $R_A$ is a benzene radical, a naphthalene radical, or a cycloalkyl radical containing 5 to 8 carbon atoms in the ring; and Z = 1 when A is an alkyl group and Z = 2 when A is an alkylene group or the defined group.

2. A composition of claim 1 wherein (A) is a polymer consisting of interpolymerized units of α-monoolefinic monomer(s) containing 2 to about 10 carbon atoms.

3. A composition of claim 2 wherein (A) is a poly-α-monoolefin homopolymer.

4. A composition of claim 3 wherein (A) is polypropylene.

5. A composition of claim 2 where in the (β-aminoacrylyl) compound, Z is 2 and A is an alkylene group or the group $-(CH_2)_n R_A-(CH_2)_n-$ wherein n is 0 or 1, and $R_A$ is a benzene or a cyclohexyl radical.

6. A composition of claim 5 wherein (B) (2) is selected from the group consisting of 1,10-bis-(β-ethoxy-β-aminoacrylyloxy)decane; α,α'-bis-(β-ethoxy-β-aminoacrylyloxy)-1,4-dimenthylcyclohexane; α,α'-bis-(β-ethoxy-β-aminoacrylylthio)-1,4-dimethylbenzene; α,α'-bis-(β-ethoxy-β-aminoacrylyloxy)-1,4-dimethylbenzene; and α,α'-bis-(β-benzyloxy-β-aminoacrylyloxy)-1,4-dimethylbenzene.

7. A composition of claim 6 wherein (B) (1) is tris-(3,5-di-t-butyl-4-hydroxybenzyl)isocyanurate.

8. A composition of claim 7 wherein (B) (2) is α,α'-bis(β-ethoxy-β-aminoacrylyloxy)-1,4-dimethylbenzene.

9. A stabilizer combination consisting essentially of (1) a phenolic stabilizer of the formula

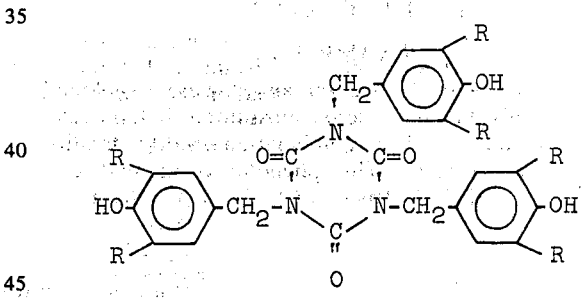

wherein R is H or an alkyl group of 1 to 9 carbon atoms where at least one R must be an alkyl group and (2) a (β-aminoacrylyl) compound of the structure

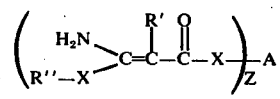

wherein X is sulfur or oxygen; R' is hydrogen or a methyl or ethyl radical; R'' is selected from the group consisting of alkyl groups containing 1 to about 24 carbon atoms, aryl groups containing 6 to about 18 carbon atoms, and ester groups containing 3 to about 24 carbon atoms total in the group; A is selected from the group consisting of alkyl groups containing 1 to about 24 carbon atoms in the group, alkylene groups containing 1 to about 18 carbon atoms in the group, and the defined group $-(CH_2)_n R_A-(CH_2)_n-$ where n is 0 to 6 and $R_A$ is a benzene radical, a naphthalene radical, or a cycloalkyl radical containing 5 to 8 carbon atoms in the ring; and Z = 1 when A is an alkyl group and Z = 2 when A is an alkylene group or the defined group.

10. A combination of claim 9 wherein the (β-aminoacrylyl) compound is selected from the group consisting of (β-octadecylthio-β-aminoacrylyloxy)ethane; (β-heptyldecylcarbonyloxyethylenethio-β-aminoacrylyloxy)ethane; (β-octadecyloxycarbonylethylenethio-β-aminoacrylyloxy)ethane; 1,10-bis-(β-ethoxy-β-aminoacrylyloxy)decane; α,α'-bis-(β-ethoxy-β-aminoacrylyloxy)-1,4-dimethylcyclohexane; α,α'-bis-(β-ethoxy-β-aminoacrylylthio)-1,4-dimethylbenzene; α,α'-bis-(β-ethoxy-β-aminoacrylyloxy)-1,4-dimethylbenzene; and α,α'-bis(β-benzyloxy-β-aminoacrylyloxy)-1,4-dimethylbenzene.

11. A combination of claim 10 wherein the phenolic stabilizer is tris-(3,5-di-t-butyl-4-hydroxybenzyl)isocyanurate.

12. A combination of claim 11 wherein the (β-aminoacrylyl) compound is α,α'-bis-(β-ethoxy-βaminoacrylyloxy)-1,4-dimethylbenzene.

* * * * *